US010491651B2

(12) United States Patent
Wu et al.

(10) Patent No.: US 10,491,651 B2
(45) Date of Patent: Nov. 26, 2019

(54) METHOD AND SYSTEM FOR STREAMING LOW-DELAY HIGH-DEFINITION VIDEO WITH PARTIALLY RELIABLE TRANSMISSION

(71) Applicant: OMNIVISION TECHNOLOGIES, INC., Santa Clara, CA (US)

(72) Inventors: Jiyan Wu, Singapore (SG); Jun Wei, Singapore (SG); Hui Pan, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 171 days.

(21) Appl. No.: 15/595,074

(22) Filed: May 15, 2017

(65) Prior Publication Data

US 2018/0331880 A1    Nov. 15, 2018

(51) Int. Cl.
*H04L 29/06* (2006.01)
*H04N 21/442* (2011.01)

(52) U.S. Cl.
CPC ............ *H04L 65/80* (2013.01); *H04L 65/602* (2013.01); *H04N 21/44209* (2013.01)

(58) Field of Classification Search
CPC ... H04L 65/80; H04L 65/4084; H04L 65/602; H04L 65/607; H04L 65/608; H04L 21/44209; H04N 21/2402; H04N 21/44209; H04N 21/6375
USPC ........................................................ 709/231
See application file for complete search history.

(56) References Cited

U.S. PATENT DOCUMENTS

| | | | | |
|---|---|---|---|---|
| 5,648,970 A | * | 7/1997 | Kapoor | H04L 47/10 370/394 |
| 5,751,719 A | * | 5/1998 | Chen | H04L 1/1809 370/394 |
| 2004/0120306 A1 | * | 6/2004 | Wigard | H04L 1/16 370/349 |
| 2007/0025388 A1 | * | 2/2007 | Abhishek | H04L 1/188 370/447 |
| 2008/0080369 A1 | * | 4/2008 | Sumioka | H04L 1/1887 370/229 |
| 2011/0026414 A1 | * | 2/2011 | Banerjee | H04L 1/0002 370/252 |

(Continued)

OTHER PUBLICATIONS

Ahmad et al., "Adaptive Unicast Video Streaming with Rateless Codes and Feedback," IEEE Transactions on Circuits and Systems for Video Technology, vol. 20, No. 2, Feb. 2010, 13 pages.

(Continued)

*Primary Examiner* — Thomas J Dailey
*Assistant Examiner* — Aye M Aung
(74) *Attorney, Agent, or Firm* — Christensen O'Connor Johnson Kindness PLLC

(57) ABSTRACT

Methods and systems for streaming low-delay, high-definition video with partially reliable transmission are disclosed herein. An example method includes determining a per-frame maximum retransmission allocation for a plurality of video packets based at least in part on a frame priority, where the plurality of video packets form at least a portion of the frame, determining a retransmission timeout for each video packet of the plurality of video packets based at least in part on a round trip time, and transmitting the plurality of video packets under traffic rate control.

17 Claims, 4 Drawing Sheets

(56) References Cited

U.S. PATENT DOCUMENTS

| | | | | |
|---|---|---|---|---|
| 2011/0274124 | A1* | 11/2011 | Tosti | H04J 3/0667 370/503 |
| 2012/0272309 | A1* | 10/2012 | Zhang | H04L 63/1466 726/13 |
| 2013/0003751 | A1* | 1/2013 | Huse | H04L 47/193 370/412 |
| 2013/0230051 | A1* | 9/2013 | Lockwood | H04L 1/22 370/394 |
| 2014/0334487 | A1* | 11/2014 | Choi | H04L 25/0202 370/390 |
| 2018/0183723 | A1* | 6/2018 | Cariou | H04W 40/02 |
| 2018/0336902 | A1* | 11/2018 | Cartwright | G06F 17/2785 |

OTHER PUBLICATIONS

Xiao et al., "Dynamic Sub-GOP Forward Error Correction Code for Real-Time Video Applications," IEEE Transactions on Multimedia, vol. 14, No. 4, Aug. 2012, 12 pages.

Tournoux et al., "On-the-fly erasure coding for real-time video applications," IEEE Transactions on Multimedia, vol. 13, No. 4, 16 pages.

Wu et al., "Content-Aware Concurrent Multipath Transfer for High-Definition Video Streaming over Heterogeneous Wireless Networks," IEEE Transactions on Parallel and Distributed Systems, vol. 27, No. 3, Mar. 2016, 14 pages.

Wu et al., "Cross-Layer Forward Error Correction Scheme Using Raptor and RCPC Codes for Prioritized Video Transmission Over Wireless Channels," IEEE Transactions on Circuits and Systems for Video Technology, vol. 24, No. 6, Jun. 2014, 14 pages.

Wu et al., "Delay-Constrained High Definition Video Transmission in Heterogeneous Wireless Networks with Multi-Homed Terminals," IEEE Transactions on Mobile Computing, vol. 15, No. 3, Mar. 2016, 15 pages.

Sgardoni et al., "Raptor Code-Aware Link Adaptation for Spectrally Efficient Unicast Video Streaming over Mobile Broadband Networks," IEEE Transactions on Mobile Computing, vol. 14, No. 2, Feb. 2015, 15 pages.

Handley et al., "TCP Friendly Rate Control (TFRC): Protocol Specification," Internet Engineering Task Force, 2003, 24 pages.

Akhshabi et al., "An Experimental Evaluation of Rate-Adaptation Algorithms in Adaptive Streaming over HTTP," Proc. of ACM MMSys., 2011, 12 pages.

Huang et al., "Confused, Timid, and Unstable: Picking a Video Streaming Rate is Hard," Proc. of ACM IMC., 2012, 14 pages.

Zhang et al., "Profiling Skype Video Calls: Rate Control and Video Quality," Proc. of IEEE INFOCOM, 2012, 9 pages.

Li et al., "Probe and Adapt: Rate Adaptation of HTTP Video Streaming at Scale," IEEE Journal on Selected Areas in Communications, 2014, vol. 32, No. 4, 15 pages.

Wu et al., "Leveraging the Delay-Friendliness of TCP with FEC Coding in Real-Time Video Communication," IEEE Transactions on Communications, 2015, vol. 63, No. 10, 17 pages.

Wu et al., "Trading Delay for Distortion in One-Way Video Communication Over the Internet," IEEE Transactions on Circuits and Systems for Video Technology, 2016, vol. 26, No. 4, 14 pages.

\* cited by examiner

METHOD AND SYSTEM FOR STREAMING LOW-DELAY HIGH-DEFINITION VIDEO WITH PARTIALLY RELIABLE TRANSMISSION

TECHNICAL FIELD

This disclosure relates generally to video transmission systems, and in particular but not exclusively, relates to real-time video communication systems.

BACKGROUND INFORMATION

Real-time transmission of high-definition video over unreliable communication networks may incur various image quality problems, e.g., missing or distorted frames, freezing, stalls, interruptions, etc. Other issues that may hinder the transmission of the video include delay constraint, reliability requirements, throughput demand, and network dynamics, etc. Additionally, conventional error-control schemes for video transmission may induce quality degradations and deadline violations in the presence of bandwidth fluctuations and network packet losses. Typical error-resilient schemes include forward error correction, automatic-repeat request (ARQ), and hybrid ARQ. While many efforts to mitigate such issues have been proposed over the years, an efficient solution has yet to materialize because the prior solutions may either focus on reducing delay or increasing reliability. Accordingly, an efficient transmission scheme for high definition video that accounts for both delay and reliability may be desired to address such issues.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
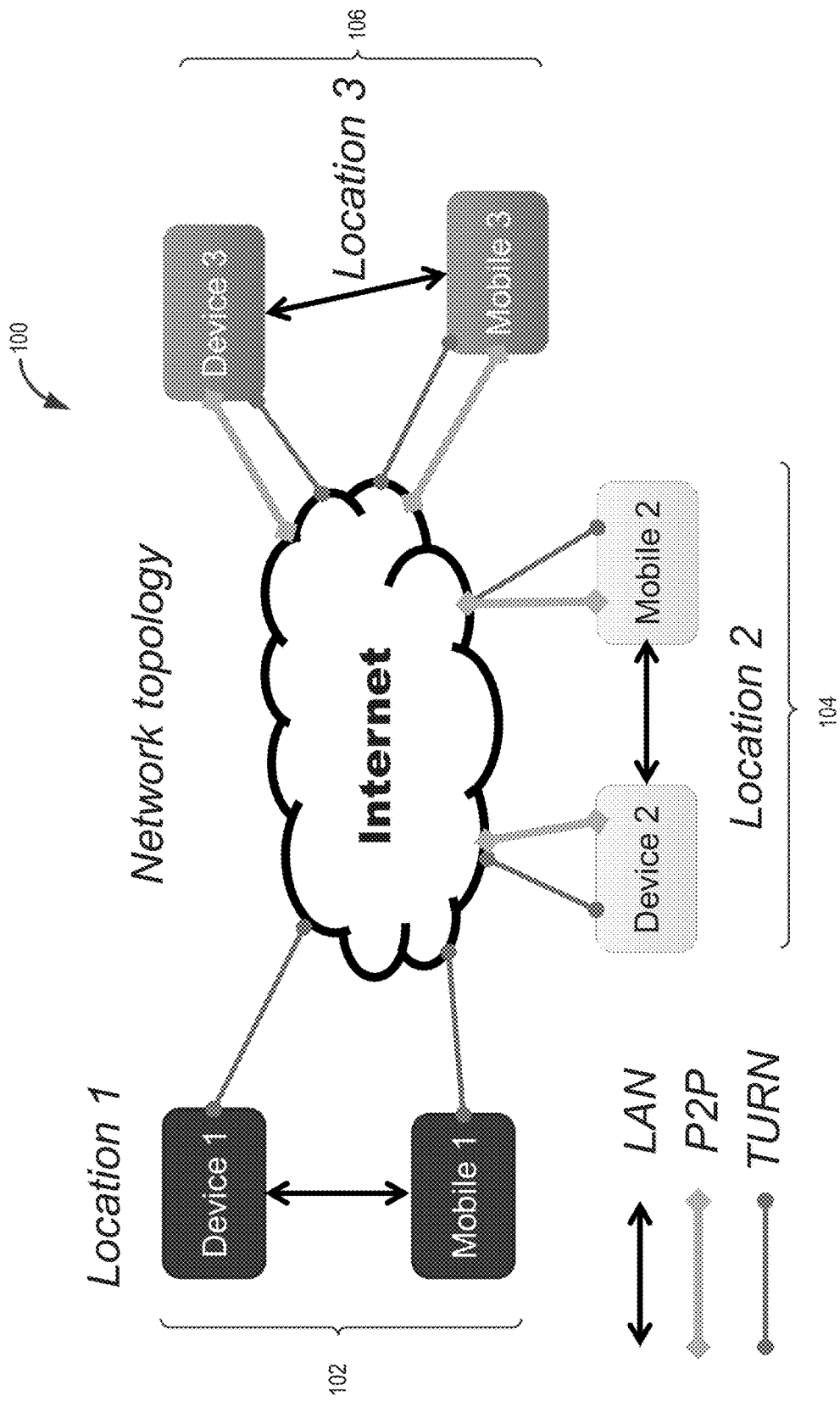
FIG. 1 is an example network topology of a communication system in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a system and method for streaming low-delay, high-definition video with partial reliable transmission are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

FIG. 1 is an example network topology of a communication system 100 in accordance with an embodiment of the present disclosure. The communication system 100 illustrates various environments for the real-time streaming of low-delay, high-definition video with partially reliable transmission. In general, the system 100 provides an at least partially reliable video packet transfer scheme that balances delay and reliability performance in real-time video transmission to provide high perceptive quality video.

The illustrated embodiment of the system 100 includes three device-mobile pairs 102, 104, and 106. Each device-mobile pair may be transmitting data packets between one another using one or more transfer modes, such as local area network (LAN), peer-to-peer (P2P), and traversal using relays around NAT (TURN), where NAT stands for network address translators. In some embodiments, each device may be transmitting real-time video using video packets and a user datagram protocol (UDP) socket, and each mobile may be receiving the video packets and transmitting acknowledgement (ACK) and/or negative acknowledgement (NAK) packets in response.

In the illustrated embodiment, each device-mobile pair is associated with a different location. For example, device 1 and mobile 1 are in location 1, device/mobile 2 in location 2, and device/mobile 3 in location 3. The different locations may represent different distances between devices and their respective mobiles. The distances between the devices and mobiles of each pair may at least affect a round trip time for communication between the devices, which, in turn, may affect reliability of the communication. The reliability may be affected because the round trip time may at least affect the number of retransmissions and retransmission timeout values. Example round trip times for each location are 50 milliseconds for location 1, 150 milliseconds for location 2, and 350 milliseconds for location 3. In some network environments, and depending on packet loss and network outage, the bandwidth usage and the number of retransmissions may increase for increasing round trip times. Additionally, the video quality may suffer, and higher frame loss ratios may occur as round trip time increases.

To counteract these decreases in quality and reliability due to increases in round trip time, the system 100, as implemented by the device-mobile pairs 102, 104, and 106, may balance the delay and reliability performance of video streaming to achieve a desired video quality through limiting a number of retransmissions per video frame and/or video packet, and by further adjusting a retransmission timeout value based on a priority of the video frame. For example, the sender of the video packets, e.g., the device in the device-mobile pairs, may split each video frame into a number of video packets, and if the number of video packets is less than a maximum buffer size, the video packets are transmitted to the respective mobile under rate control. Additionally, the sending device may determine a maximum number of retransmissions and a retransmission value to apply to the video packets of each video frame based at least in part on the priority level of the video frame. For example, intra-frames (i-frames) may be more important than predicted-frames (p-frames), and, as such, may have a shorter retransmission timeout value while having a larger maximum number of retransmissions allowed.

The receiver of the video packets, the mobile in this example, may reorder the received packets and determine if there are any missing video packets based on a sequence number assigned to each video packet. The sequence numbers may be assigned sequentially and restarted for each video frame, for example. For each received video packet, the mobile may provide an ACK packet in response, and for each missing video packet, the mobile may provide an NAK packet. In general, each video packet may promote either an ACK or a NAK packet based on whether or not it is received by the receiver 212. Additionally, the sequence number of the video packets associated with the ACK and/or NAK packets may be used by the device to update the device buffer.

Figure 2:
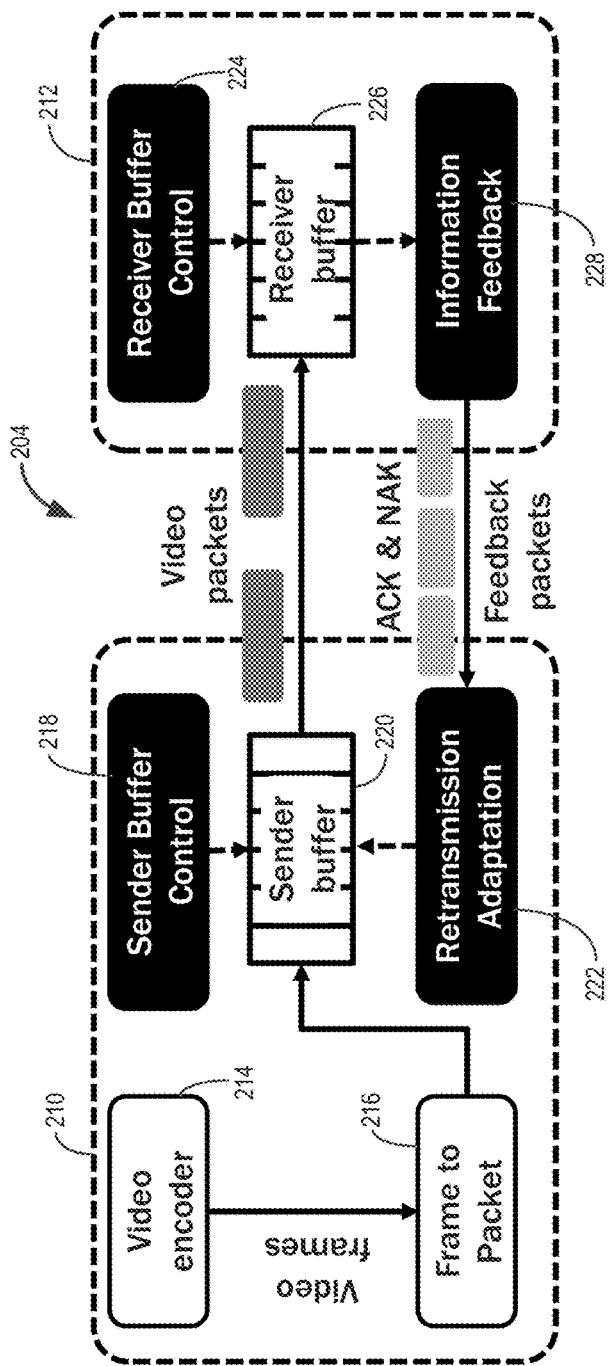
FIG. 2 is a device-mobile pair in accordance with an embodiment of the present disclosure.

FIG. 2 is an example device-mobile pair 204 in accordance with an embodiment of the present disclosure. The device-mobile pair 204 is an example of one of the device-mobile pairs 102, 104, and/or 106, and is not limited to any specific pair illustrated in FIG. 1. The illustrated pair 204 includes a sender 210 and a receiver 212. The sender 210, which may be an example of a device of FIG. 1, may transmit real-time video to the receiver 212, which may be an example of a mobile device of FIG. 1. The video may be transmitted using any of the transfer modes illustrated in FIG. 1. Additionally, the sender 210 may implement a video-aware retransmission scheme, and both the sender 210 and the receiver 212 may implement respective network-adaptive buffer controls. In general, the sender 210 transmits video packets to the receiver 212, and the receiver 212 transmits ACK and/or NAK packets in response. Based on the receipt of an NAK packet or the non-receipt of an ACK packet within a retransmission timeout, the sender 210 may retransmit an associated video packet. The number of retransmissions per frame of video, and a retransmission timeout value for receiving the ACK packets may be affected by a priority of the frame, e.g., whether it is an i-frame or a p-frame.

The illustrated embodiment of the sender 210 includes a video encoder 214, a frame to packet builder 216, a sender buffer control 218, a sender buffer 220, and a retransmission adaptation control 222. The video encoder 214 may encode video frames using constant bit rate or variable bit rate. In some embodiments, the video encoder 214 is an H.264 codec that supports video compression up to 720 p and 30 fps. Example video encoding rates include 1, 1.5, 2, and 3 Mbps, and the instantaneous decoder refresh period (IDR) is 1 with each i-frame being an IDR frame. The i-frames may be completely independent. Other example encoding parameters include the number of frames per a group of pictures (GoP), GoP structure, and maximum and minimum quantization parameter. Examples of the same may be 8, 10, or 15 frames per GoP, IPPPP . . . P for GoP structure, and 40 and 20 for max and min quantization parameter.

The frame to packet builder 216 may receive the encoded frames from the video encoder 214 and build video packets based thereon. Each video packet may at least include a header and a payload, with the header at least including video packet identification information. For example, the header may include a sequence number for each packet. The sequence number may indicate the order of the video packet within each frame, for example. In some embodiments, the sequence number may be used to determine whether a video packet is missing. For example, the receiver 212 may place the video packets in order by sequence number in the receiver buffer 226, then make a determination whether there are any gaps in the sequence, which would indicate missing video packets.

The sender buffer 220 may receive the video packets from the frame to packet builder 216. The sender buffer may be sized to temporarily store 64 or 128 video packets. In some embodiments, the sender buffer 220 holds 64 video packets. The video packets may be transmitted through a MAC and PHY layer, for example, from the sender buffer 220. After transmission, each video packet may remain in the sender buffer 220 until the sender 212 determines that the video packet has been received by the receiver 214. For example, a video packet may be removed upon receipt of an associated ACK packet, or after a retransmission timeout has lapsed. However, some of the video packets may be retransmitted one or more times before being removed from the sender buffer 220.

The sender buffer control 218 may control the initial transmission of the video packets using a desired transmission rate control, and may further remove or replace video packets that have confirmed successful delivery, either through receipt of associated ACK packets or retransmission timeouts. In some embodiments, the sender buffer control 218 may implement a sender buffer control algorithm that controls and monitors the transmission rate, retransmission rate, and retransmission timeout, which will be discussed in more detail below.

The retransmission adaptation control 222 may be coupled to receive ACK and NAK packets from the receiver 212, and further coupled to the sender buffer 220. The retransmission adaption control 222, based on various network and video packet parameters, may determine which video packets provided by the frame to packet builder 216 may be stored in the sender buffer 220 after their initial transmission, a lower and upper limit of the sender buffer 220 (e.g., the number of video packets to be stored per frame), and a maximum retransmission number and retransmission timeout for each video packet in sender buffer 220. The various network and video packet parameters that determines the output of the retransmission adaptation control 222 may at least include round trip time, packet loss rate, and video frame size, but other parameters may also be included.

The maximum retransmission number may set an upper limit on a number of retransmissions. In some embodiments, the maximum retransmission number is applied for per video frame, where a plurality of video packets form a frame. In other embodiments, the maximum retransmission number is applied to each video packet. Additionally, the retransmission timeout may be adapted, e.g., dynamically changed, for each video packet. In some embodiments, the importance of the frame, and by extension the video packets that form the frame, may affect the retransmission timeout and the maximum retransmission number. For example, an i-frame of a GoP may have a higher maximum retransmission number and a lower retransmission timeout to ensure reliable transmission of the i-frame video packets, whereas subsequent p-frames of the GoP may have smaller maximum retransmission numbers and longer retransmission timeouts due to their minor importance. As such, in the GoP, the i-frame would be the most important and each subsequent p-frame less important. In terms of only p-frames, each p-frame may be less important than the previous p-frame. Accordingly, for the GoP, the i-frame will have the highest maximum retransmission number and the shortest retransmission timeout, and each subsequent p-frame may have a lower maximum retransmission number and a longer retransmission timeout than the previous p-frame.

The illustrated embodiment of the receiver 212 includes a receiver buffer control 224, a receiver buffer 226, and an information feedback module 228. The receiver buffer 226 may receive the video packets, and temporarily store them. The receiver buffer 226 may be sized similarly to the sender buffer 220. For example, the receiver buffer 226 may be sized to store 64 or 128 video packets. While not shown, the receiver buffer 226 may provide the video packets to components to extract the data from the video packets and to decode the data into playable video frames, for example.

The receiver buffer control 224 may control the receiver buffer 226 and the transmission of NAK and ACK packets. For example, the receiver buffer 224 may cause the received video packets to be reordered based on their sequence numbers, if they are received out of order. Additionally, the receiver buffer 224 may cause an ACK packet to be transmitted by the information feedback module 228 once a video packet is received. In some embodiments, the ACK packet notifies the sender 210 to change the lower bound of the sender buffer 220 as the same sequence number, e.g., remove the video packet of the same sequence number from the sender buffer 220. Additionally, transmitted NAK packets may also carry the lower bound of the receiver buffer 226 to provide the same ACK information. However, if the received video packet is not the lower bound of the receiver buffer 226, then NAK packets are sent for each missing video packet to prompt the retransmission of the missing video packets by the sender 212.

Figure 3:
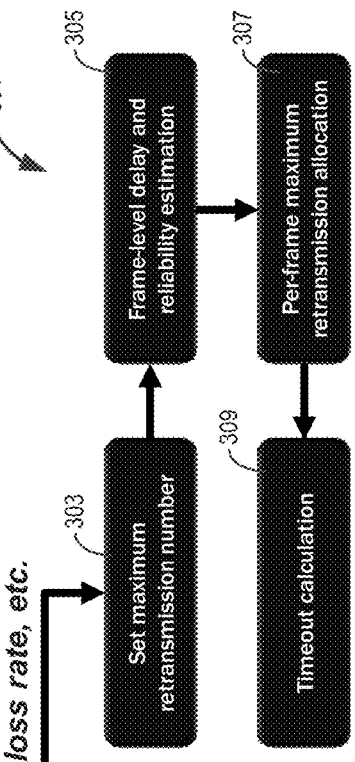
FIG. 3 is an example retransmission adaptation process in accordance with an embodiment of the present disclosure.

FIG. 3 is an example retransmission adaptation process 301 in accordance with an embodiment of the present disclosure. The process 301 may be an example of a process implemented by the retransmission adaption control 222. Based on various frame and network information, the process 301, for each video packet and/or frame, may set a maximum retransmission number, a frame-level delay and reliability estimation, a per-frame maximum retransmission allocation, and a retransmission timeout. These determined values may affect the reliability of the video packet transmission through the system 100, for example.

The process 301 may receive various network and frame-related inputs, such as a round trip time between sender and receiver, a frame size, a frame priority, a video packet size, a number of video packets per frame, a video packet loss rate, a counted video packet retransmissions, a delay constraint, an end-to-end delay, and available bandwidth. A subset of these inputs may be used by each the process blocks 303-309 to determine their respective parameters.

The process block 303 may initially receive the above listed inputs, and determine a maximum retransmission number in response. For example, the process block 303 may determine a maximum retransmission number for a frame of video packets or for each video packet in a frame, both of which are contemplated herein, based on the delay constraint, the available bandwidth, the round trip time, and the packet size. The delay constraint may be a deadline constraint imposed on the transmission of the video packets. An example delay constraint is 150 milliseconds. In some embodiments, the maximum retransmission number may alternatively or additionally be based on a retransmission ratio and a total number of sent video packets. For example, a retransmission ratio may be selected, which is then multiplied by the total number of sent video packets to determine the maximum retransmission number. An example retransmission ratio is 0.3. In some embodiments, the maximum retransmission number may be determined per frame of video and may set a maximum number of times all the video packets in a frame may be retransmitted. For example, and using the above retransmission ratio, if the number of video packets to be transmitted for a frame is 10, then the maximum retransmission number for that frame would be 0.3*10, which would be 3. As such, the number of retransmissions for those 10 video packets combined would be 3. Once 3 retransmissions for that video packet occurs, no more retransmission may be allowed.

The process block 305 may determine the frame level delay and reliability estimation based on the frame size, the estimated packet loss rate, and the number of packets per frame. The reliability estimation may estimate the percentage of video packets of a frame to make it to the receiver, where higher reliability estimations may be desirable for important frames, e.g., i-frames, and lower reliability estimations may be allowed for lower priority frames, e.g., p-frames. The frame level delay may provide the delay associated with transmitting and retransmitting the video frame from the sender 210 to the receiver 212, for example. These values may indicate an expected quality of the streamed video.

The process block 307 may determine the per-frame maximum retransmission allocation based on the frame priority and the counted packet retransmissions. The frame priority, for example, may be based on whether the frame is an i-frame or a p-frame. The per-frame maximum retransmission allocation value may be used to adjust the maximum retransmission number based at least on the priority of the frame. For example, the maximum retransmission number may be increased for an i-frame, but decreased for a p-frame.

The process block 309 determines a retransmission timeout based on the estimated end-to-end delay and the round trip time. The end-to-end delay may be determined based on the time from encoding to decoding using time stamps of sent video packets and received ACK packets. The retransmission timeout may be applied to video packets, and defines a wait time or window in which an ACK packet is expected for a transmitted video packet. If an ACK packet is not received within the retransmission timeout, the sender 210 may determine whether the video packet is to be retransmitted based at least on the maximum retransmission number and/or the per-frame maximum retransmission allocation.

The parameters determined by the process 301 may, in general, affect which video packets of a frame are to be stored in the sender buffer, the lower and upper limit of the sender buffer, e.g., how many video packets to store, the maximum retransmission number for each frame/video packet, and the retransmission timeout value for each video packet in the sender buffer. These parameters may also affect the overall reliability and delay for real-time streaming of high-definition video.

Figure 4:
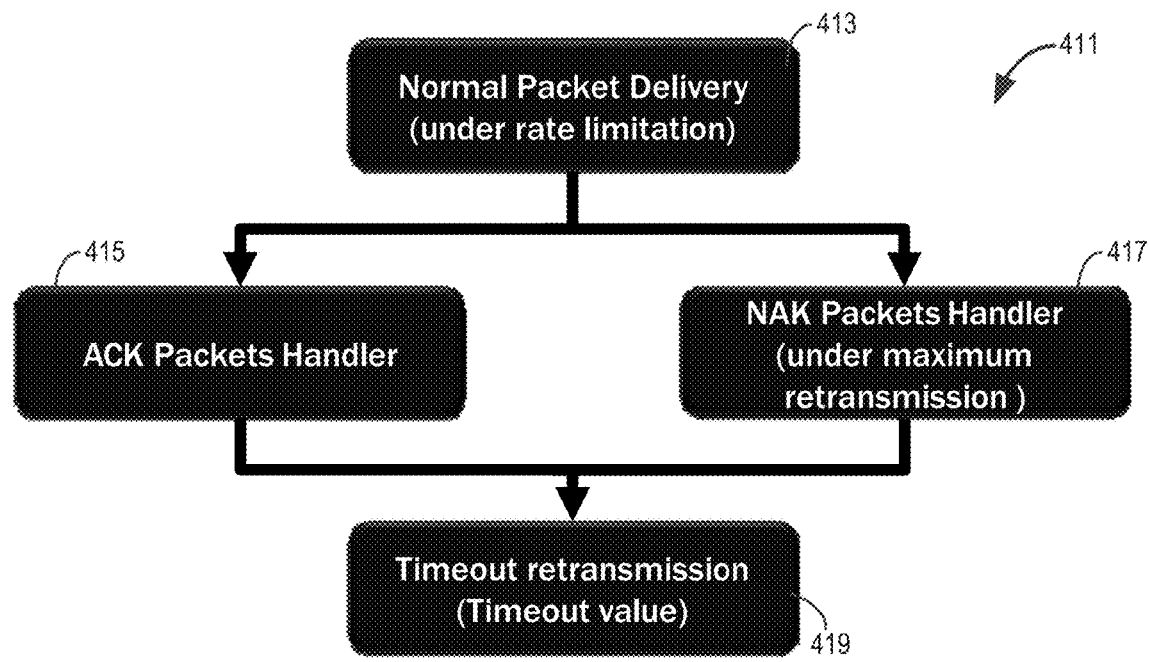
FIG. 4 is an example sender buffer control process in accordance with an embodiment of the present disclosure.

FIG. 4 is an example sender buffer control process 411 in accordance with an embodiment of the present disclosure. The process 411 may be implemented by the sender buffer control 218, for example. The sender buffer control process 411 may, in general, control the video packet delivery, sender buffer update, and proactive video packet substitution, at least for video packets of high priority frames. For example, if video packets of an i-frame are provided by the frame to packet builder 216, then they may proactively replace video packets of a p-frame currently in the sender buffer 220.

The process 411 may begin at process block 413, which controls the video packet transmission control using a transmission rate limitation. In some embodiments, the video packet transmission control may send video packets to the receiver if the frame satisfies the sender buffer usage and rate control constraints. In addition to the normal packet delivery, the process 411 also handles the receipt of the ACK and NAK packets, which may be used to update the sender buffer by controlling retransmissions of video packets and changing the lower bound of a slide window of the sender buffer 220. The slide window may be a window of video packets in the sender buffer 220 that highlights video packets that are still awaiting receipt confirmation from the receiver 212.

The process block 415 may control the handling of video packets in response to receipt of an ACK packet. In response to an ACK packet, the sender buffer control 218 may compare the sequence number included in the ACK packet to the sequence numbers of the video packets currently stored in the sender buffer 220. If the sequence number of the received ACK packet is within the sequence numbers, then the buffer controller 218 changes the upper bound of the sliding window to be this value, e.g., removes this video packet from the sender buffer 220. Updating the sliding window opens up room in the sender buffer 220 for additional video packets from an incoming frame to be transmitted by the normal packet delivery process 413.

The process block 417 may control the handling of NAK packets when received from the receiver 212. When a NAK packet is received by the sender 210, the sender buffer control 218 may retransmit the associated video packet, if the sequence number of the video packet is within the bounds of the sliding window, and if the frame-level retransmission number is larger than zero, e.g., has not been exhausted. It should be noted that the maximum retransmission number sets the maximum number of retransmissions for video packets of a frame, and that the number of retransmission is counted per frame and once the maximum number is reached, then no more retransmissions for video packets of that frame may be allowed. For example, if a counter is set to the maximum number and is reduced for each transmission, then once the counter equals zero no more retransmissions for video packets of that frame may be performed. Additionally, if a video packet is retransmitted in response to a NAK packet, then a timer for that packet is reconfigured and the retransmission timeout is re-calculated, e.g., by process 301.

The process block 419 may control timeout retransmissions of video packets in the sender buffer 220. The timeout retransmissions may be performed based on a per-video packet timer and a retransmission timeout value. Each video packet in the sender buffer 220 may have an associated packet timer set for an associated retransmission timeout value, which may be initiated on a first transmission and reset for any and each retransmission. The retransmission timeout value may be set for proactive retransmission, where proactive retransmission may result in the retransmission of a video packet prior to receiving an associated NAK packet during long distance, e.g., around 2000 Km, transmissions of video packets. By setting the retransmission timeout value to allow for proactive retransmission, long distance real-time video quality may not suffer due to excessive waits for NAK packets prior to retransmitting lost video packets.

Figure 5:
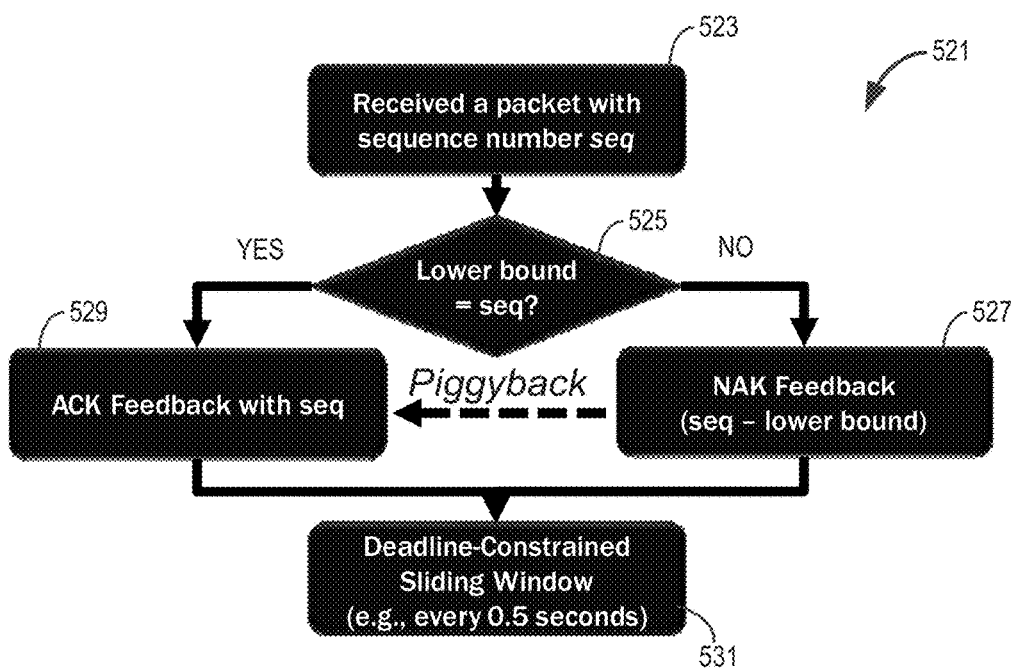
FIG. 5 is an example receiver buffer control process in accordance with an embodiment of the present disclosure.

FIG. 5 is an example receiver buffer control process 521 in accordance with an embodiment of the present disclosure. The process 521 may be implemented by the receiver buffer control 224, for example. The receiver buffer control process 521 may, in general, control the transmission of ACK and NAK packets in response to receipt of or non-receipt of associated video packets.

The process 521 may begin at process block 523, which determines the sequence number of each received video packet. Process block 523 is followed by process block 525, which determines whether the sequence number is the lower bound of the receiver buffer 226. The lower bound may imply the last number, e.g., largest number, in the list of sequence numbers for a frame or partial frame of video packets, for example, and incremental from a previous number. Stated another way, the receiver buffer control 224 may determine if there are any missing numbers in the sequence based on the latest received video packet and prior received video packets in the frame or partial frame. If the sequence number is the lower bound, then process block 529 follows, else process block 527 follows.

The process block 527 may transmit one or more NAK packets to the sender 212 for retransmission of video packets missing in the current sequence of packet numbers. For example, if the sequence number of the received video packets has gaps of missing packets, then the receiver buffer control 224 may cause the information feedback module 228 to send an NAK packet for each missing sequence number. The process block 529, on the other hand, may transmit an ACK packet acknowledging receipt of the video packet. The ACK packet may also provide the sender the lower bound of the sequence number so the sender may update the sender buffer and remove the acknowledged video packet. Additionally, in order to mitigate problems caused by delayed/lost ACK packets and to facilitate the sender buffer 220 removal of video packets, the NAK packet(s) may also carry the lower bound of the sequence numbers received, which informs the sender 210 of the lower bound of the sequence at the receiver 212.

The process block 531 may implement a deadline-constrained sliding window to guarantee the smoothness of real-time streaming in the face of bandwidth shrinkage or network outage, which may block the receiver 212 from receiving video packets. For example, the video packets in such a network environment may become dropped or overdue. The deadline-constrained sliding window may adaptively slide the receiver window, e.g., list of sequence numbers, and send video packets in the receiver buffer 226 to a decoder of the receiver 212 prior to receiving all the video packets in a GoP. In such an embodiment, the decoder may use slice-level error concealment from previously received frames. In some embodiments, a timer for each GoP may be started once the first video packet of the GoP i-frame is received and stored in the sender buffer 220. And if the timer becomes equal to a GoP duration, e.g., a time that it may take to receive all the video packets for the frames of the GoP, and there are still remaining video packets that have yet to be received, these video packets, once received, may be provided to the decoder with the slice-level error concealment from previously received frames.

Figure 6:
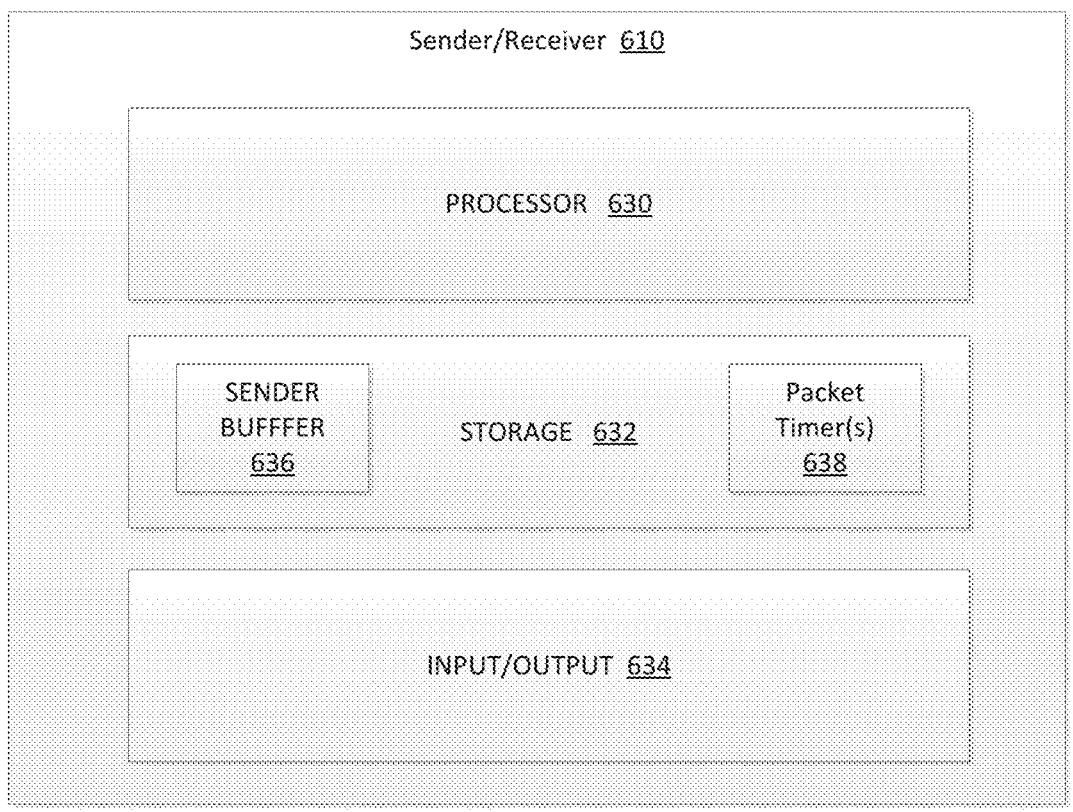
FIG. 6 is a functional block diagram of a sender in accordance with an embodiment of the present disclosure.

FIG. 6 is a functional block diagram of a sender 610 in accordance with an embodiment of the present disclosure. The sender 610 may be an example of the sender 210. It should be noted that the functional block diagram of the sender 610 may similarly apply to a receiver, such as the receiver 212. The sender 610 may be implemented in hardware, software, firmware, or combinations thereof, and may implement processes 301 and 411 as disclosed herein. In some embodiments, the sender 610 may transmit, in real time, video packets to a receiver, such as the receiver 212. In response, the receiver 212 may provide NAK and ACK packets based on non-receipt or receipt of the video packets, respectively.

The illustrated embodiment of the sender 610 includes a processor 630, storage 632, and input/output 634. The processor 630 may be a general purpose processor, a microcontroller, or an application specific integrated circuit. In some embodiments, the processor 630 may control the transmission and retransmission of video packets from the sender 610 through execution of code stored in the storage 632. The code may include instructions for transmitting the video packets, and also includes instructions for implementing the ACK and NAK based retransmission control schemes as illustrated by processes 301 and 411. The processor 630 may transmit the video packets and receive the ACK and NAK packets via the input/output 634.

The storage 632, which may be volatile or non-volatile storage, may include sender buffer 636 and packet timer(s) 638. The sender buffer 636 may be a partitioned area of the storage 632 and be large enough to temporarily store up to 64 video packets. The packet timer(s) 638, likewise, may be an area of the storage 632, and may be used to track the timeout counters of video packets upon transmission and retransmission.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A method, comprising:
    determining, by a sender, a per-frame maximum retransmission allocation for a plurality of video packets based at least in part on a frame priority and a counted number of retransmissions, wherein the plurality of video packets form at least a portion of the frame;
    determining, by the sender, a retransmission timeout for each video packet of the plurality of video packets based at least in part on a round trip time, and wherein the per-frame maximum retransmission allocation is based on an importance of the frame relative to other frames within a group of pictures, and wherein as the importance increases the retransmission timeout decreases;
    setting a maximum retransmission number based on a delay constraint, an available bandwidth, the round trip time, and a packet size of the plurality of video packets, and wherein retransmission on at least one of a per-frame or a per-video packet basis is disallowed when the counted number of retransmissions reaches the maximum retransmission number; and
    transmitting, by the sender, the plurality of video packets under rate control.

2. The method of claim 1, wherein determining the retransmission timeout for each video packet of the plurality of video packets is further based on an estimated end-to-end delay.

3. The method of claim 1, further comprising:
    determining a frame level delay based on a frame size, an estimated packet loss rate, and a number of video packets per frame.

4. The method of claim 3, further comprising:
    determining a reliability estimation based on the frame size, the estimated packet loss rate, and the number of video packets per frame.

5. The method of claim 1, wherein the frame priority is based on whether the frame is an intra-frame or a predicted-frame.

6. The method of claim 1, further comprising:
    receiving, by the sender, an acknowledgement (ACK) packet;
    determining, by the sender, if a sequence number provided by the ACK packet identifies a video packet of the plurality of video packets in a sender buffer, wherein each video packet in the plurality of video packets has an associated sequence number; and
    removing the identified video packet from the sender buffer.

7. The method of claim 1, further comprising:
    receiving, by the sender, a negative acknowledgement (NAK) packet;
    determining, by the sender, if a sequence number provided by the NAK packet identifies a video packet of the plurality of video packets in a sender buffer, wherein each video packet in the plurality of video packets has an associated sequence number;
    determining, by the sender, whether the per-frame maximum retransmission allocation has been exhausted; and
    retransmitting the identified video packet if the identified video packet is in the sender buffer and the per-frame maximum retransmission allocation has not been exhausted.

8. The method of claim 7, further comprising:
    setting a retransmission timer for the retransmitted identified video packet.

9. The method of claim 7, further comprising:
    determining whether the identified video packet is within a sliding window of the sender buffer, and wherein retransmitting the identified video packet is based, at least in part, on whether the identified video packet is within the sliding window of the sender buffer.

10. The method of claim 9, wherein upon retransmitting the identified video packet, the retransmission timeout is re-calculated.

11. The method of claim 1, wherein the maximum retransmission number is further based, at least in part, on a selected retransmission ratio.

12. The method of claim 1, further comprising:
receiving, by the sender, an acknowledgement (ACK) packet;
comparing a sequence number included in the ACK packet to corresponding sequence numbers associated with the plurality of video packets stored within a buffer of the sender; and
updating an upper bound of a slide window for the buffer of the sender when the sequence number is within the corresponding sequence numbers.

13. A non-transitory computer readable storage medium (CRM) including instructions that, when executed by a processor, cause the processor to:
determine a per-frame maximum retransmission allocation for a plurality of video packets based at least in part on a frame priority and a counted number of retransmissions, wherein the plurality of video packets form at least a portion of the frame, wherein the frame priority is based on whether the frame is an intra-frame or a predicted-frame;
determine a retransmission timeout for each video packet of the plurality of video packets based at least in part on a round trip time, wherein the per-frame maximum retransmission allocation is based on an importance of the frame relative to other frames within a group of pictures, and wherein as the importance increases the retransmission timeout decreases;
set a maximum retransmission number based on a delay constraint, an available bandwidth, the round trip time, and a packet size of the plurality of video packets, and wherein retransmission on at least one of a per-frame or per-video packet basis is disallowed when the counted number of retransmissions the maximum retransmission number; and
transmit the plurality of video packets under rate control.

14. The non-transitory CRM of claim 13, wherein the retransmission timeout for each video packet of the plurality of video packets is further determined based on an estimated end-to-end delay.

15. The non-transitory CRM of claim 13, further including instructions that, when executed by the processor, cause the processor to:
determine a frame-level delay based on a frame size, an estimated packet loss rate, and a number of video packets per frame.

16. The non-transitory CRM of claim 13, further including instructions that, when executed by the processor, cause the processor to:
perform a reliability estimation based on the frame size, the estimated packet loss rate, and the number of video packets per frame.

17. A method, comprising:
determining, by a sender, a per-frame maximum retransmission allocation for a plurality of video packets based at least in part on a frame priority and a counted number of retransmissions, wherein the plurality of video packets form at least a portion of the frame;
determining, by the sender, a retransmission timeout for each video packet of the plurality of video packets based at least in part on a round trip time;
setting a maximum retransmission number based on a delay constraint, an available bandwidth, the round trip time, and a packet size of the plurality of video packets, wherein retransmission on at least one of a per-frame or a per-video packet basis is disallowed when the counted number of retransmissions reaches the maximum retransmission number, and wherein the maximum retransmission number is further based, at least in part, on a selected retransmission ratio; and
transmitting, by the sender, the plurality of video packets under rate control.

* * * * *